(12) United States Patent
Wurzbach et al.

(10) Patent No.: US 9,360,130 B2
(45) Date of Patent: Jun. 7, 2016

(54) METHOD FOR GREASING THE MATED THREADS OF A THREADED CONNECTOR AND RELATED DEVICE

(71) Applicant: York Laboratories, LLC, York, PA (US)

(72) Inventors: Richard Wurzbach, Brogue, PA (US); Gary Tilton, Red Lion, PA (US); Evan Bupp, Red Lion, PA (US); Lisa Williams, York, PA (US)

(73) Assignee: York Laboratories, LLC, York, PA (US)

( * ) Notice: Subject to any disclaimer, the term of this patent is extended or adjusted under 35 U.S.C. 154(b) by 192 days.

(21) Appl. No.: 14/151,015

(22) Filed: Jan. 9, 2014

(65) Prior Publication Data

US 2014/0197348 A1   Jul. 17, 2014

Related U.S. Application Data

(60) Provisional application No. 61/752,652, filed on Jan. 15, 2013.

(51) Int. Cl.
*F16K 31/50* (2006.01)
*F16H 57/04* (2010.01)

(52) U.S. Cl.
CPC .......... *F16K 31/508* (2013.01); *F16H 57/0464* (2013.01); *F16H 57/0497* (2013.01)

(58) Field of Classification Search
CPC ............ F16H 57/0464; F16H 57/0497; F16H 57/0408; F16H 57/0463; F16H 57/0456; F16K 31/508; F16K 31/20
USPC ................. 251/355; 384/446; 74/89.44, 89.43
See application file for complete search history.

(56) References Cited

U.S. PATENT DOCUMENTS

| | | | |
|---|---|---|---|
| 2,816,566 A | 2/1954 | Warren | |
| 2,760,585 A * | 8/1956 | Bergeron | E21B 17/006 118/408 |
| 5,300,848 A * | 4/1994 | Huss | H02K 16/00 310/191 |
| 2011/0146430 A1 * | 6/2011 | Chen | F16H 57/0497 74/89.44 |

* cited by examiner

*Primary Examiner* — Marina Tietjen
(74) *Attorney, Agent, or Firm* — Hooker & Habib, P.C.

(57) ABSTRACT

A method for greasing the mated threads of a valve stem and a stem nut of a motor-operated valve without the need to actuate the valve and without the need for an internal grease path within the stem nut includes pressurizing one end of the thread interface defined by the mating threads with pressurized grease. A device for carrying out the method may include a thread lubricator that has a bore that receives the free end of the valve stem and an adapter nut that attaches the thread lubricator to the valve housing. Pressurized grease flows into the thread lubricator and to the one end of the tread interface.

8 Claims, 3 Drawing Sheets

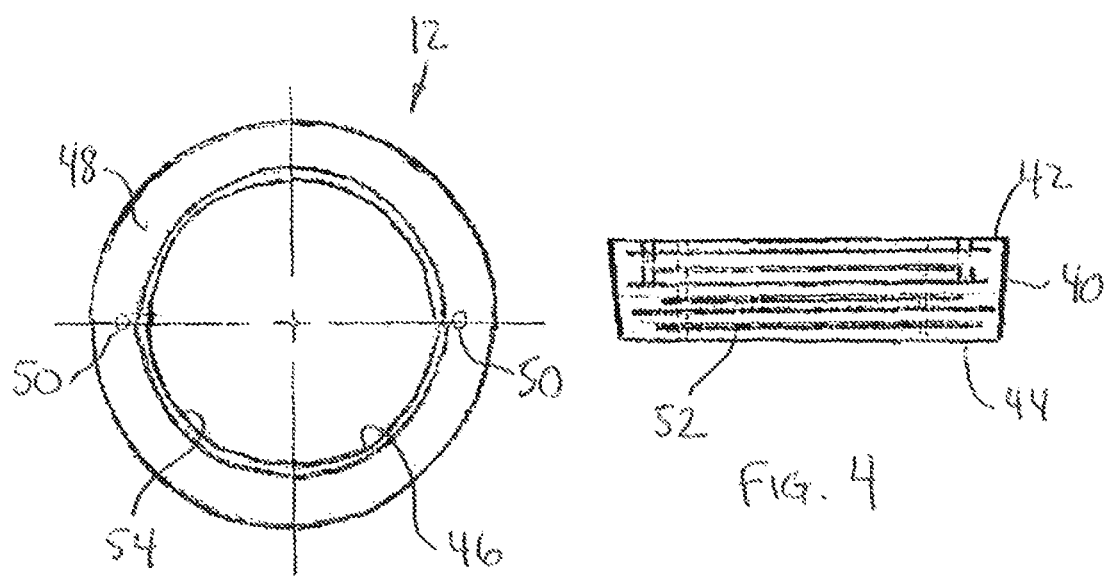

METHOD FOR GREASING THE MATED
THREADS OF A THREADED CONNECTOR
AND RELATED DEVICE

FIELD OF THE DISCLOSURE

This disclosure relates to a method for greasing the mated threads of a threaded connector and a related device for carrying out the method, and in particular to a method for greasing the mated threads of a valve stem and stem nut.

BACKGROUND OF THE DISCLOSURE

A stem nut is a threaded nut that surrounds and threadingly engages the threads of a reciprocating or movable valve stem. Rotation of the stem nut causes axial movement of the valve stem.

Some stem nuts include an internal grease path for introduction of grease to grease or lubricate the mated threads of the stem nut and the valve stem.

Other stem nut and valve stem designs, however, do not provide an internal grease path. For example, motor operated valves used in the nuclear power industry are typically designed without internal grease paths included in the stem nuts. Re-lubrication of the mating thread area requires cycling the valve to an open position to expose the valve stem threads above the stem nut. While this may seem like a minor operation, many motor operated valves cannot be conveniently cycled without causing liquid inventories to flow.

Other valves having a valve stem and stem nut arrangement permit only insignificant exposure of the valve stem threads. The full movement of the valve stem may occur through only a quarter-turn of the stem nut, or some other short stroke. The short stroke does not sufficiently expose the valve stem threads in the mating area of the valve stem for the effective manual application of grease by a brush or other means.

Yet other valves having a valve stem and stem nut arrangement enable substantial exposure of the valve stem threads. Grease can be applied to the exposed valve stem threads. Warren, U.S. Pat. No. 2,816,566 discloses, for example, a valve having a valve stem and stem nut arrangement in which a portion of the valve stem immediately below the stem nut is normally exposed. This lower portion of the valve stem is made to pass through a cylindrical sleeve that loosely surrounds the valve stem portion. A fitting attached to the sleeve allows grease to be supplied to the sleeve for greasing the lower valve stem portion.

But even where valve stem threads can be exposed for application of grease, entry of valve stem threads into the stem nut can wipe much of this applied grease from the stem. Wiping of the grease by the stem nut may result in less than optimal coverage of the mating thread surfaces with grease.

Thus there is a need for an improved method of greasing the mated threads of a threaded connector, and in particular, an improved method of greasing the mated threads of a valve stem and a valve stem nut, that does not require an internal grease path in the stem nut, does not require movement of the stem valve relative to the stem nut, and does not rely only on greasing the threads of the valve stem outside of the stem nut.

BRIEF SUMMARY OF THE DISCLOSURE

Disclosed is a method for greasing the mated threads of a valve stem and a stem nut which includes the step of pressurizing with pressurized grease one end of the thread interface defined by the mating threads with pressurized grease.

The threaded grease flows into the one end of the thread interface and flows towards the other, opposite end of the thread interface to grease and lubricate the mated threads without the need to actuate the valve and without the need for an internal grease path within the stem nut.

The pressurized grease displaces the old grease in the thread interface and forces the old grease to be discharged from the other end of the thread interface. The old grease can be collected and analyzed for preventative maintenance purposes.

An embodiment of a device for conducting the disclosed method includes a thread lubricator and an adapter nut. The thread lubricator has a bore that receives the free end of the valve stem and flows pressurized grease to the thread interface.

The adapter nut attaches the thread lubricator to the valve housing. In a possible embodiment, the adapter nut threads into an opening that normally mounts a valve stem protector and includes external threads that cooperate with external threads on the thread lubricator to position the thread lubricator against a face of the stem nut, the thread lubricator compressing a resilient seal against the face of the stem nut.

In a possible embodiment of the thread lubricator, the closed end of the lubricator bore is spaced away from the valve stem, enabling the lubricator to remain attached to the valve housing during normal operation of the motor-operated valve.

It is contemplated that an inventory of adapter nuts and thread lubricators will be maintained to enable lubrication of different sizes and styles of motor-operated valves.

Other objects and features of the disclosure will become apparent as the description proceeds, especially when taken in conjunction with the accompanying drawing sheets.

BRIEF SUMMARY OF THE DRAWINGS

FIGS. 3 and 4 are front and top views respectively of an adapter nut forming part of the lubrication device.

DETAILED DESCRIPTION

Figure 1:
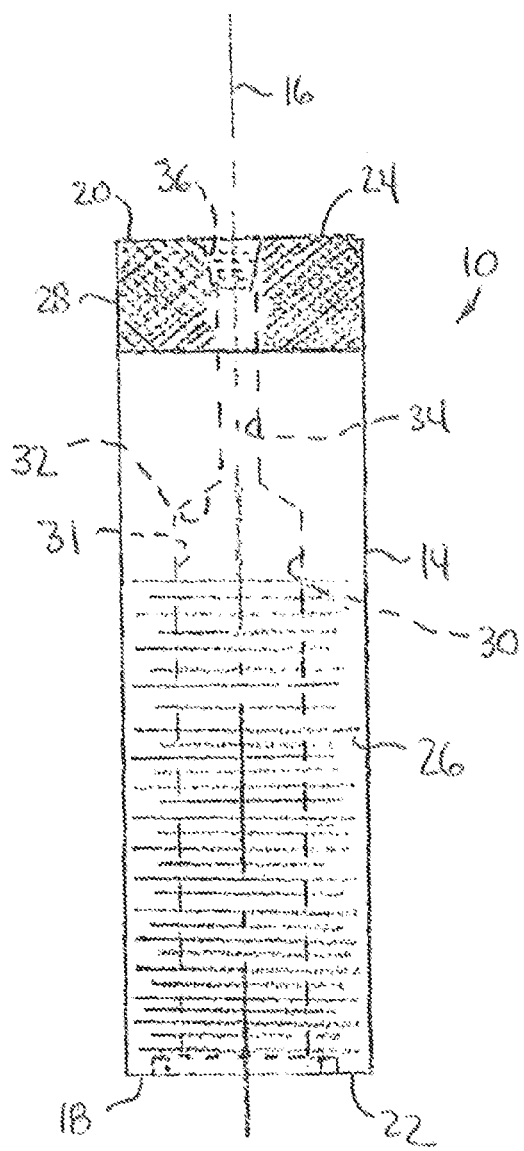
FIGS. 1 and 2 are front and bottom views respectively of a thread lubricator forming part of a lubrication device.
Figure 2:
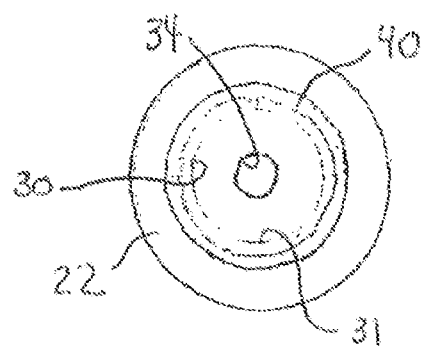

FIGS. 1-4 illustrate the components of a device that can be used in carrying out the disclosed method for greasing the mated threads of a threaded connector. FIGS. 1 and 2 illustrate a thread lubricator 10. FIGS. 3 and 4 illustrate an adapter nut 12 that is used with the thread lubricator 10.

The thread lubricator 10 is an elongate, generally cylindrical body 14 extending along a central axis 16 from an open first end 18 to an axially opposite closed second end 20. The first end 18 has a flat front face 22, and the second end 20 has a flat rear face 24.

Formed on the outside of the body 14 are external threads 26 extending axially from the first end 18 towards the second end 20. A knurled end portion 28 is located adjacent the second end 18, the knurls facilitating manual rotation of the thread lubricator 10.

A blind, smooth-walled internal circular bore 30 defined by a bore wall 31 coaxial with the axis 16 extends into the body 14 from the open end 18 and extends from the open 18 to a closed bore end 32.

As will be described in more detail below, the bore 30 acts as a reservoir for receiving and holding pressurized grease. To introduce the pressurized grease into the reservoir, an axial flow channel 34 coaxial with the axis 16 extends from the closed bore end 30 and opens at the second face 24 to fluidly communicate the reservoir with an outside source of pressurized grease (not shown). The outer portion 36 of the flow channel 34 adjacent the face 24 is conical, expanding outwardly as the channel 34 extends towards the face 24 and is threaded with an internal pipe thread that mounts a grease fitting 38 (see FIG. 5). An annular O-ring groove 40 is formed in the front face 32 and surrounds the bore 30 and normally carries an O-ring 41 (see FIG. 5) that, when uncompressed, is proud of the front face 32.

The adapter nut 12 is an annular member having a tapered body 40 extending axially from a broader end 42 to a narrower end 44 that surrounds a circular through-bore 46. A flat upper face 48 located at the broader end 42 has a pair of diametrically opposite clearance holes 50 extending into the face 48, the holes 50 configured to receive the pins of a conventional spanner wrench (not shown).

Formed on the outside of the nut body 40 are external pipe threads 52 extending the length of the body 40. Formed on the inside of the wall surrounding the through-bore 46 are internal threads 54 configured to threadingly mate with the external threads 26 of the thread lubricator 10.

Figure 5:
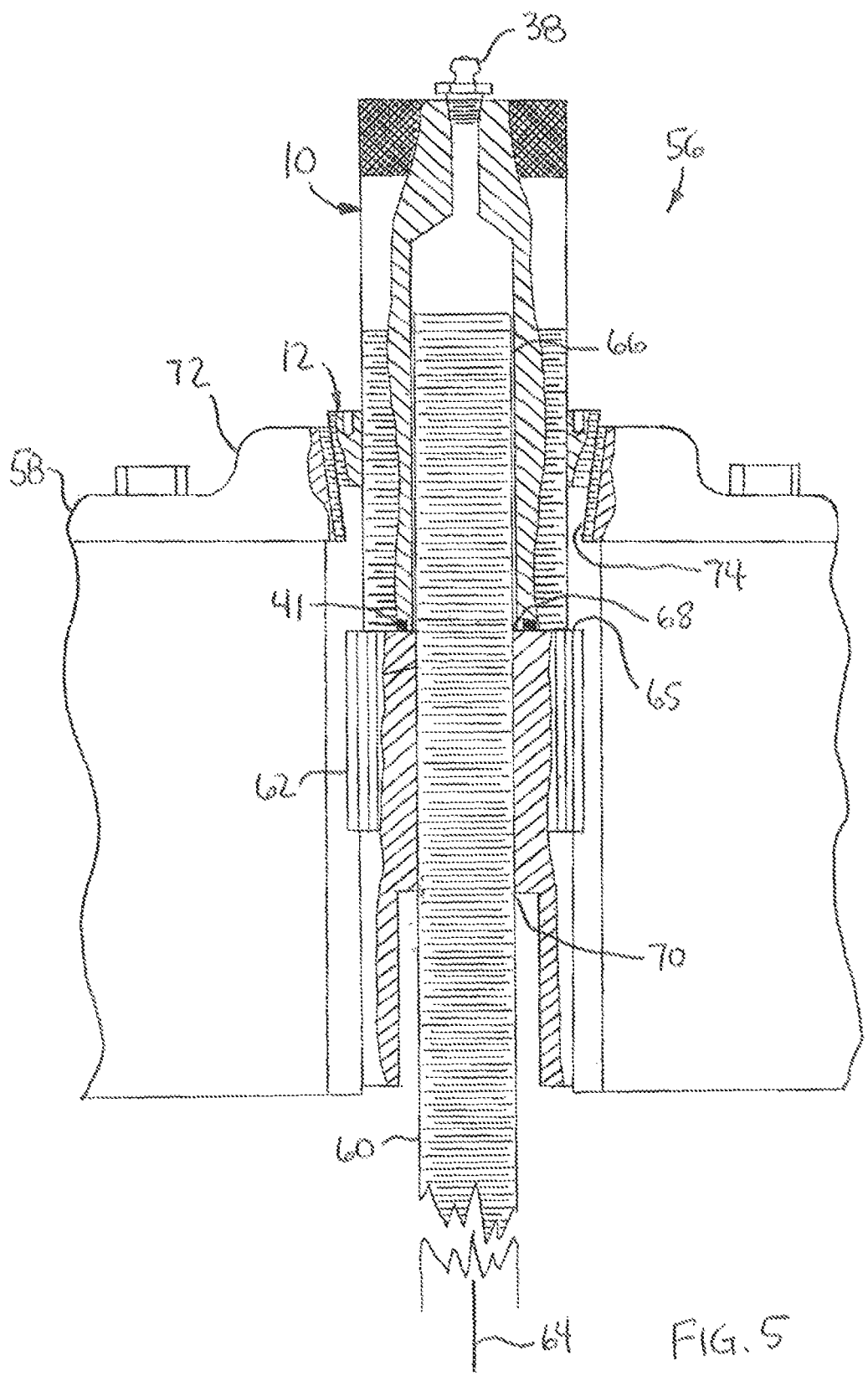
FIG. 5 is a front, partial vertical sectional view of the lubrication device mounted on a motor-operated valve for greasing the mating threads of a valve stem and stem nut of the motor-operated valve.

FIG. 5 illustrates the thread lubricator 10 and adapter nut 12 forming a lubrication device 56. The lubrication device 56 is shown attached to a conventional motor operated valve (MOV) 58 having a threaded valve stem 60 and a stem nut 62. The illustrated valve stem 60 has a conventional Acme or trapezoidal thread. The stem nut 62 does not include an internal grease path.

The valve stem 60 extends along a stem axis 64 and includes a free end portion 66 extending away from a flat annular surface 65 of the stem nut 62. The mated threads of the valve stem 60 and the stem nut 62 define between them a threaded interface extending axially along the stem axis 64 between an upper interface end 68 and a lower interface end 70.

The MOV 58 has a housing 72 that encloses the stem nut 62 and a portion of the valve stem 60. The valve stem 60 extends through an opening wall 74 formed in the housing 72. The opening wall 74 is threaded to receive the threaded end of a conventional valve stem cover or threaded protector tube (not shown) that normally attaches to the housing 72. The valve stem cover when present encloses and protects that part of the valve stem end portion 66 extending out of the housing 68. The MOV 58 is otherwise conventional and so will not be described in further detail.

An embodiment of the disclosed method applies pressurized grease to one of the interface ends 68, 70. The pressurized grease flows into the thread interface from the one end of the interface and greases the mated threads of the valve stem and stem nut. The flow of pressurized grease displaces the old grease in the thread interface and forces the old grease to flow towards the other end of the thread interface. A sufficient flow of pressurized grease into the thread interface forces the old grease to flow out from the other end of the thread interface; the escaping old grease can be collected for analysis. Preferably pressurized grease is supplied to the one end of the interface with sufficient pressure and for a sufficient time to flow the pressurized grease to the other end of the thread interface.

To carry out the disclosed method on the MOV, the valve stem cover is removed from the housing 72 and the adapter nut 12 is threaded into the housing opening 74. The external male threads 52 of the adapter nut 12 mate with the female threads of the housing wall 74. The adapter nut 12 is tightened to the housing 72 using a spanner wrench. Because the threads of the housing wall 74 are typically tapered pipe threads, only a few turns of the adapter nut 12 are needed to securely attach the adapter nut 12 to the housing 72.

The thread lubricator 10 is placed over the free end portion 66 of the valve stem 60, with the valve stem being received through the lubricator open end 18 and centered in the lubricator bore 30. The O-ring 41 faces the upper face 65 of the stem nut 62.

The thread lubricator bore 30 and the flow channel 34 are initially empty. The thread lubricator 10 is then threaded into the adapter nut 12, the external straight threads 26 of the thread lubricator mating with the straight female threads 54 of the adapter nut 12. Threading the thread lubricator 10 into the adapter nut 12 moves the thread lubricator 10 axially towards the stem nut 62 until the O-ring 41 tightly presses against the upper face 65 of the stem nut. The thread lubricator 10 presses the O-ring 41 against the stem nut face 65 with sufficient force to form a hydraulic seal extending between the facing ends 22, 65 of the thread lubricator 10 and the stem nut 62.

FIG. 5 illustrates the device after the O-ring 41 has been pressed against the stem nut 12 to form the seal. The O-ring 41 surrounds the upper end of the thread interface 68 and forms a fluid seal between the upper face 65 of the stem nut 62 and the face 22 of the thread lubricator 10. The valve stem portion 66 is closely received in the lubricator bore 30, but there is radial clearance between the bore wall 31 and the valve stem threads.

New pressurized grease is then introduced into the thread lubricator 10 through the grease fitting 38. The pressurized grease may, for example, be introduced using a conventional manually operated lever grease gun (not shown) attached to the grease fitting 38. The pressurized grease flows through the flow channel 34 and into the annular space between the bore wall 31 and the valve stem threads towards the stem nut 62, filling the available volume within the lubricator 10 with pressurized grease. The O-ring seal between the thread lubricator 10 and the stem nut 62 prevents the escape of pressurized grease from between the opposing faces 22, 65 of the thread lubricator 10 and the valve stem 62.

Continued flow of pressurized grease through the grease fitting 38 and into the thread lubricator bore 30 forces pressurized grease to flow into the thread interface from the upper end 68 of the threaded interface and flow towards the other, lower end 70 of the threaded interface. The pressurized grease within the threaded interface will apply an axial force between the mated threads of the valve stem 60 and the stem nut 62 that may be sufficient to cause relative axial movement between the valve stem and stem nut. Such axial movement would be limited, however, to the axial slip allowed by the engaged threads.

The flow of pressurized grease through the thread interface displaces the old grease in the thread interface and replaces it with fresh grease. The pressure of the fresh grease forces the old grease to flow towards the other end 70 of the thread interface. Escaping old grease emerging from the lower end 70 of the thread interface can be sampled for later grease analysis for preventative maintenance purposes. It is not necessary to actuate the MOV 56 to displace the valve stem 60 or to otherwise expose threads along the thread interface defined by the valve stem 60 and stem nut 62.

When the old grease has been fully purged from the thread interface and only new pressurized grease is escaping from the lower end 70 of the threaded interface, the application of pressurized grease can be discontinued.

After the mated threads of the valve stem and stem nut have been greased, the lubrication device 56 can be removed and the valve stem cover replaced on the housing.

Alternatively, the lubrication device 56 can remain attached to the housing. The thread lubricator protects the end portion of the valve stem while the remaining new grease inside the lubrication device can grease the exposed threads of the valve stem portion. When intended to possibly remain attached to the housing, the axial length of the thread lubricator bore 30 has sufficient length and clearance to accommodate vertical movement of the valve stem during operation of the MOV 58.

It is contemplated that an installation having a number of valves 56 may have different thread lubricators 10 and adapter nuts 12 of various sizes to form lubrication devices 56 for use with different valve stem/stem nut geometries and different housing openings.

The thread lubricator 10 is preferably formed of metal but could be fabricated from any material having the requisite strength to withstand the hydraulic pressure generated by the pressurized grease. The adapter nut 12 is preferably formed of metal for secure attachment of the lubricating device 54 to the housing 72 during greasing of the thread interface.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. A method for greasing the mated threads of a threaded valve stem and a threaded stem nut threaded on the valve stem, the mated threads defining a thread interface between the mated threads of the valve stem and the stem nut extending along the valve stem between a first end and a second end of the thread interface, the method comprising the steps of:
    enclosing one end of the thread interface with a pressure vessel, the pressure vessel defining an interior volume in fluid communication with the thread interface;
    flowing pressurized grease into the interior volume of the pressure vessel and thereby pressurizing the one end of the thread interface with pressurized grease, wherein the pressurized grease in the pressure vessel comes into fluid communication with the thread interface and flows into the one end of the thread interface between the mated threads and towards the other end of the thread interface.

2. The method of claim 1 wherein the one end of the thread interface is pressurized for a sufficient time and sufficient pressure such that the pressurized grease flows to the other end of the thread interface.

3. The method of claim 1 wherein the flow of pressurize grease towards the other end of the thread interface displaces old grease in the thread interface, the method further comprising the steps of:
    pressurizing the one end of the thread interface for a sufficient time and sufficient pressure for old grease to flow out of the other end of the thread interface; and
    analyzing at least a portion of the old grease after the old grease flowed out of the other end of the thread interface.

4. The method of claim 1 wherein the step of closing the one end of the thread interface with a pressure vessel comprises placing the pressure vessel over a free end portion of the valve stem.

5. The method of claim 4 wherein the step of closing the one end of the thread interface with a pressure vessel comprises compressing a resilient seal surrounding the one end of the thread interface between the pressure vessel and the stem nut.

6. The method of claim 4 comprising the step of removing a valve stem hood enclosing the free end portion of the valve stem prior to placing the pressure vessel over the free end portion of the valve stem.

7. The method of claim 6 wherein the pressure vessel remains placed over the free end portion of the valve stem during normal operating movement of the valve stem caused by rotation of the stem nut.

8. The method of claim 6 wherein the step of removing the valve stem hood comprises the step of unthreading the valve stem hood from a threaded opening of a housing enclosing the thread interface; and
    the step of placing the pressure vessel over the free end portion of the valve stem comprises threading an adapter nut into the threaded opening and threading the pressure vessel into the adapter nut.

* * * * *